L. N. VINCENT.
AUTOMATIC OILER OR LUBRICATOR.
APPLICATION FILED MAR. 12, 1917.

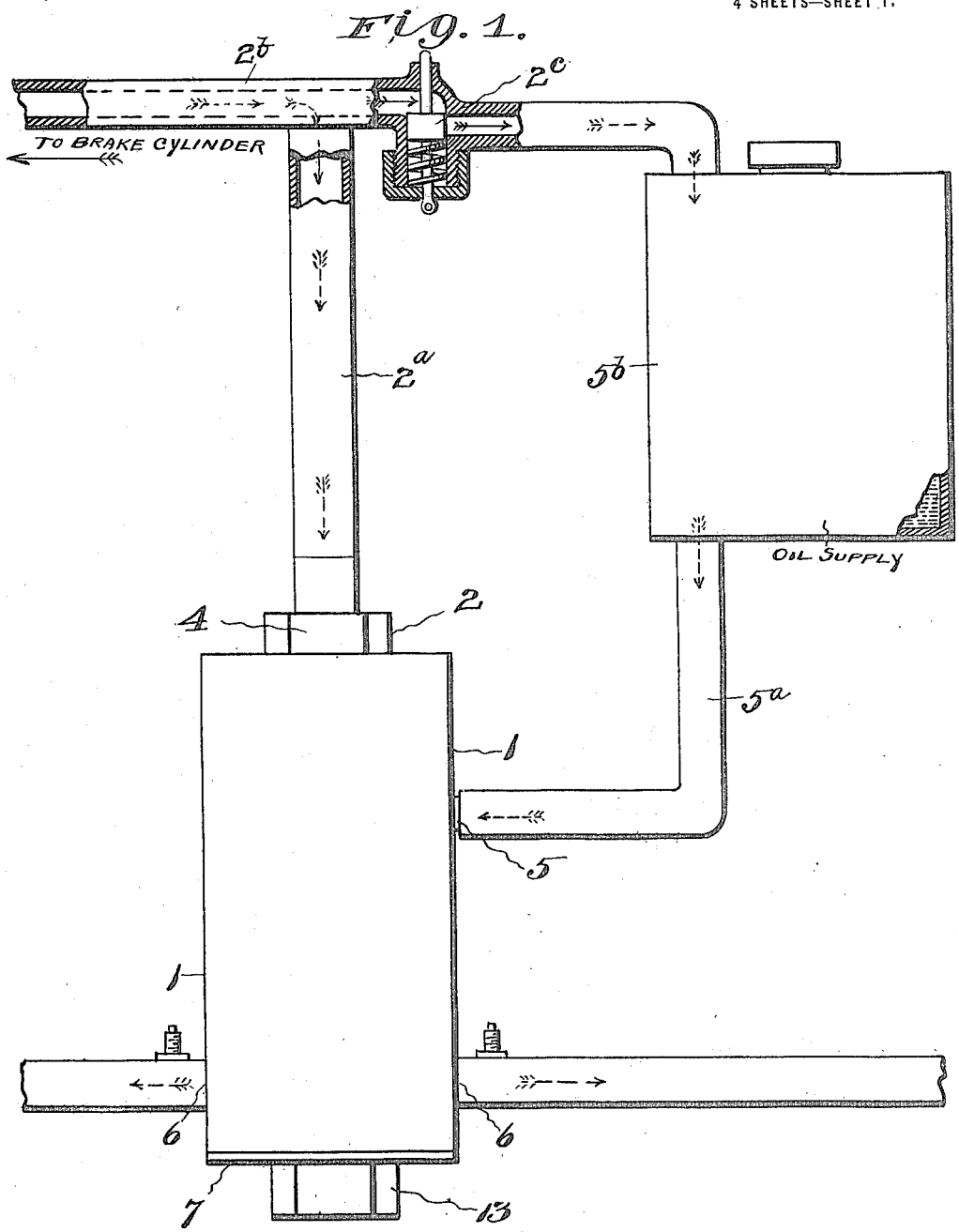

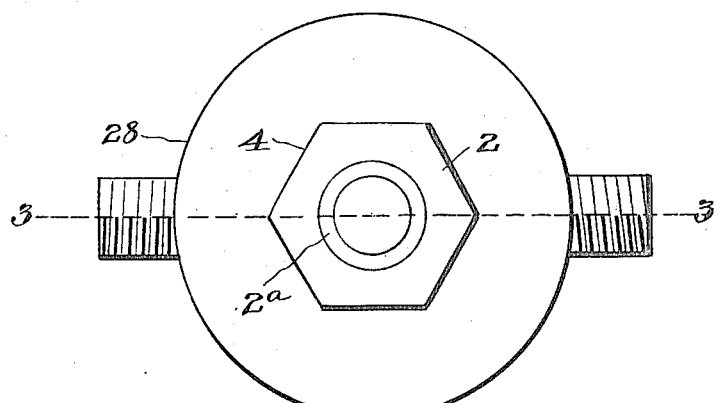
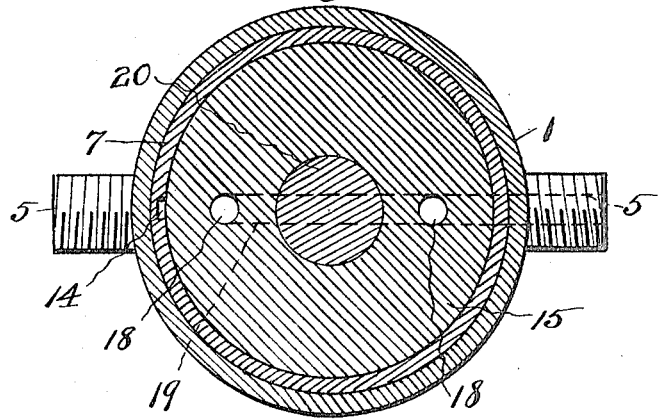
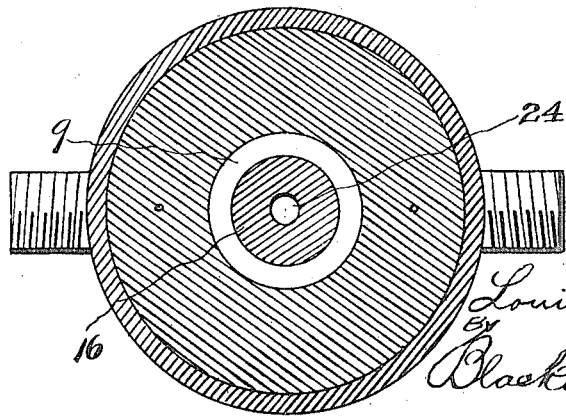

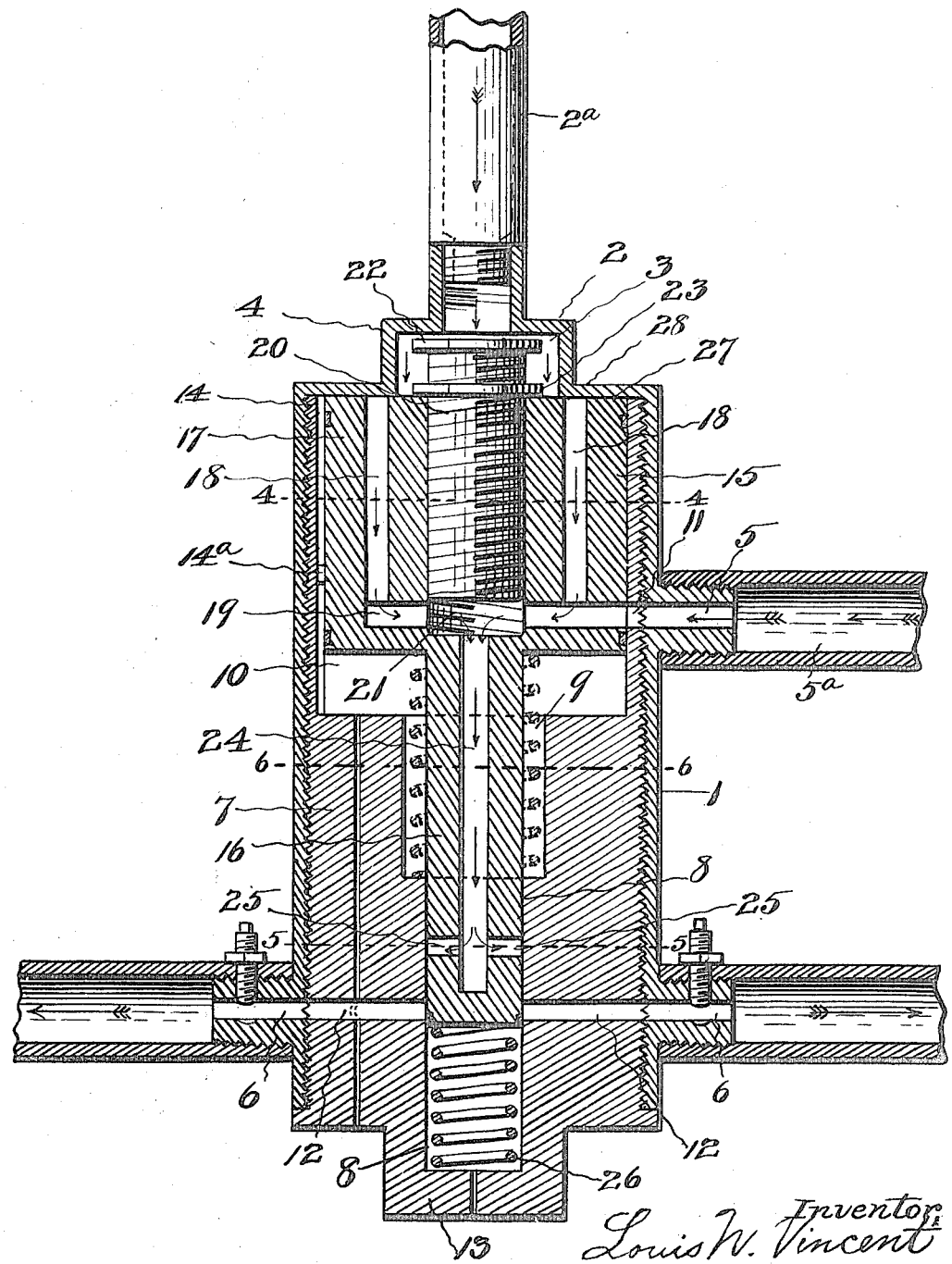

1,234,585.

Patented July 24, 1917.
4 SHEETS—SHEET 4.

Inventor
Louis N. Vincent
By Blackwood Bros,
Attorneys

UNITED STATES PATENT OFFICE.

LOUIS N. VINCENT, OF PRESCOTT, ARIZONA.

AUTOMATIC OILER OR LUBRICATOR.

1,234,585.

Specification of Letters Patent.

Patented July 24, 1917.

Application filed March 12, 1917. Serial No. 154,182.

*To all whom it may concern:*

Be it known that I, LOUIS N. VINCENT, residing at Prescott, in the county of Yavapai and State of Arizona, a citizen of the United States, have invented certain new and useful Improvements in Automatic Oilers or Lubricators; and I do hereby declare the following to be a full, clear, and exact description of the invention, such as will enable others skilled in the art to which it pertains to make and use the same.

My invention relates to improvements in an automatic oiler or lubricator, and more especially to an oiler or lubricator for use in oiling the flanges of the wheels of locomotives, motors, cars and all kinds or types of gears, axles, shafts, journals, hub plates, &c.

The object of the invention is to provide an oiler or lubricator which is normally inoperative, but which at the proper time automatically becomes operative, preferably through the medium of steam or compressed air, and supplies oil or lubricant to the part or parts to be lubricated.

A further object is to provide an oiler or lubricator, adapted to be connected to a brake cylinder of any well known compressed air or steam brake system, which will automatically operate and supply and cut off the oil or lubricant to the part or parts desired simultaneously with the setting and releasing of the brakes of the brake system.

A further object is to supply lubricant to the part or parts to be lubricated while they are in motion and also to feed the oil against pressure.

A further object is to provide an oiler or lubricator which is normally inoperative but which automatically operates and supplies oil or lubricant intermittently to the part or parts desired.

A further object is to supply or feed the exact amount of oil or lubricant required to lubricate the flange of a wheel or other article just at the point and at the time needed.

A further object is to provide means to eliminate or reduce to a minimum degree the frictional resistance of the flanges of the wheels of a locomotive, motor or other similar vehicle on the curves of a track, and thereby prevent the undue wear of the wheels and track, and cause the wheels to run, easily, smoothly and noiselessly.

A further object is to provide an oiler or lubricator with means whereby the amount of oil or lubricant delivered, at each operation thereof, can be regulated to suit the special requirements of each article being lubricated.

A still further object is to provide an oiler or lubricator which is simple, inexpensive and durable in construction, very compact, easily operated, which is not likely to get out of order and which can be readily and quickly assembled or taken apart.

The invention consists in the several features and in the construction, combination and arrangement of features as more fully hereinafter described and claimed.

Referring to the drawings:—

Figure 1 is a side elevation of my invention.

Fig. 2 is a top plan view.

Fig. 3 is a vertical section taken on the line 3—3 of Fig. 2.

Fig. 4 is a horizontal section taken on the line 4—4 of Fig. 3.

Fig. 6 is a horizontal section taken on the line 6—6 of Fig. 3.

Figure 5:
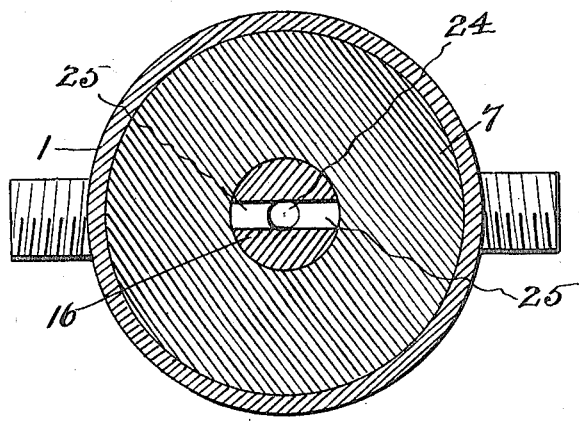
Fig. 5 is a horizontal section taken on the line 5—5 of Fig. 3.
Figure 7:
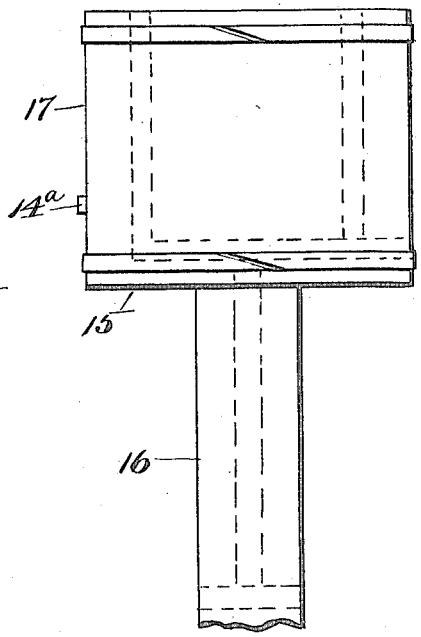
Fig. 7 is a side view in elevation of the reciprocatable valve.

In the drawings in which similar reference characters denote similar parts throughout the several views, 1 represents the outer interiorly screwthreaded member or casing provided with an upwardly extending portion 2 connected to compressed air or steam pipe $2^a$ which is connected to a pipe $2^b$ in communication with the brake cylinder, and having an interior chamber 3, a hexagonal exterior 4, adapted for the application of a wrench or other suitable tool, oil inlet 5, adapted for connection with a pipe $5^a$ from a tank $5^b$ or any source of oil supply, oil outlets 6 adapted for connection to a suitable pipe for delivering oil or lubricant to the part or parts to be lubricated.

A spring controlled valve 2ᶜ is provided in the pipe 2ᵇ for the purpose of retaining the air or steam pressure on the oil in the supply tank when the pressure in pipe 2ᵇ is released.

An inner externally screwthreaded member 7 is provided adapted to be screwed into the outer member 1, having a socket 8 and recess 9 in its lower portion, a chamber 10 in its upper portion open at the top, oil inlets 11 and oil outlets 12 respectively registering with the inlet 5 and outlets 6 of the outer member 1, a depending hexagonal portion 13, adapted for the application of a wrench or other suitable tool, and a slot or groove 14 in its inner surface.

A reciprocatory valve 15 is provided, mounted in inner member 7, having a stem 16 mounted in the socket 8 and a head 17 mounted in the chamber 10.

The head 17 of the valve is provided with vertical ports 18 for the admission of compressed air or steam, a horizontal port 19 communicating with the vertical ports 18 and the oil or lubricant supply inlets 5 and 11 of the outer and inner members, respectively, a lug or pin 14ᵃ adapted to be seated and slide in the groove or slot 14 of the inner member to prevent the valve from turning in the inner member and thereby keeping the oil or lubricant supply ports in alinement or registry, and in order to regulate the supply of oil or lubricant to the valve a screwthreaded adjustable plug 20 is provided which is mounted in a screwthreaded bore or socket 21 communicating with the port 19 at the bottom, and is provided with a head 22 and a screw nut or ring 23 for the purpose of securing the plug in its adjusted positions.

The stem 16 of the valve is provided with a central port 24 communicating with the horizontal port 19 of the head 17 and horizontal ports 25 adapted to communicate with the oil or lubricant outlets 6 and 12.

A spiral spring 26 is provided in the bottom of the socket 8 of the inner member for the purpose of keeping the valve in its normal or closed position seated against the inner surface 27 of the top 28 of the outer member.

Figure 8:
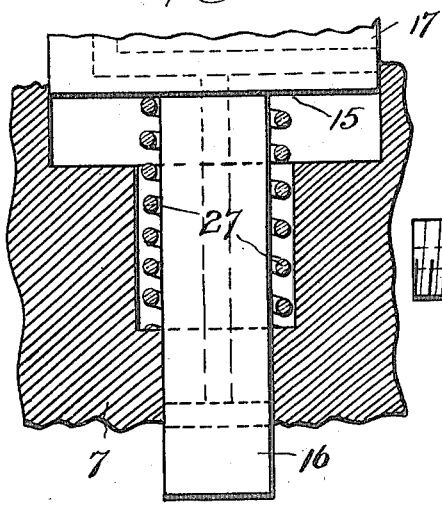
Fig. 8 is a side view, partly in section, of a modified means for returning the valve to its normal position.

The spring 26 is made of such a degree of strength that it will suffice to retain the valve in its closed position under ordinary pressure conditions, but should the pressure be increased so that the spring 26 is too weak for the purpose a stronger spring 27 would be used to coöperate with the spring 26 as shown in Fig. 8 of the drawings.

Figure 9:
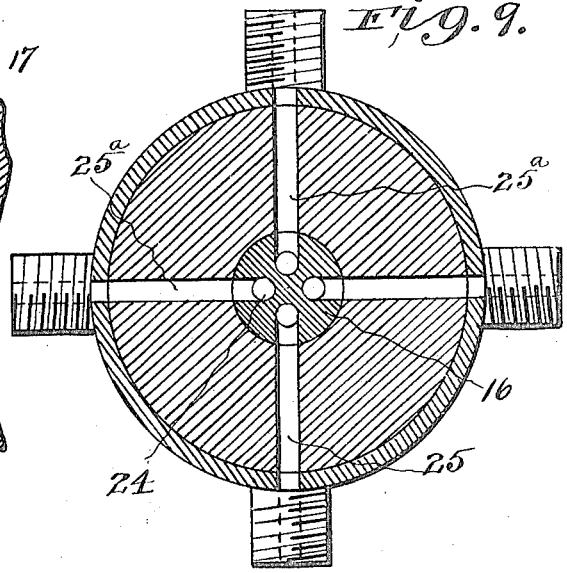
Fig. 9 is a modified form of valve.

A modified form of my invention is shown in Fig. 9 in which a plurality of oil outlets 25ᵃ are provided in order that a number of bearings may be oiled with one oiler.

In using the valve for oiling or lubricating the flanges of locomotives, motors or car wheels the valve just contains sufficient oil or lubricant to properly oil or lubricate the flange, and the flange being oiled or lubricated on approaching a curve leaves more or less oil or lubricant on the inside of the rails and results in the locomotive, motor or car being able to take the curve very easily and smoothly.

I preferably connect the valve to a pipe connected to the cylinder of an air or steam pressure brake system and operate the valve by means of the air or steam pressure therefrom, the result being that each time the brakes are set oil or lubricant will be supplied by the valve to the part or parts to be lubricated and the amount of air or steam necessary to operate the valve is so small that it does not affect or interfere with the braking system.

In operation the valve being in its closed or normal position with the screw plug adjusted to the desired point or elevation so as to admit only the required quantity of oil or lubricant, the oil or lubricant flows into the valve and fills the ports thereof, then as compressed air or steam is admitted through the compressed air or steam inlet the pressure of the same on the top of the valve immediately causes it to move downward, against the tension of the spiral spring, which causes the vertical ports 18 to become uncovered or opened, the oil supply to be cut off, by the oil inlet being out of register with the horizontal port 19 of the valve and causes the horizontal ports 25 to register with the oil outlets 12.

As the compressed air or steam moves the valve downward it also passes into the vertical ports 18, the horizontal port 19, where it meets the oil or lubricant and forces the same through the central port 24, horizontal ports 25 and out through the oil outlets 12 and 6 to a suitable pipe, not shown, by which it is adapted to be delivered to the part or parts to be lubricated. Just as soon as the air or steam pressure is released the spiral spring 26 returns the valve to its normal closed position against the top 28 of the outer member which closes the vertical ports 18 and causes the oil inlet to register with the horizontal port 19 of the valve when the valve is ready for further operations.

I do not wish to be understood as limiting myself to the specific details of construction and arrangement as hereinafter described and illustrated, as it is manifest that variations and modifications may be made in the features of construction and arrangement in the adaptation of the device to the various conditions of use without departing from the scope of my invention and improvements.

I therefore reserve the right to all such variations and modifications as properly fall within the scope of my invention and the terms of the following claims.

What I claim is:—

1. In an automatic oiler or lubricator, a reciprocatable valve having a series of communicating ports for steam or compressed air and lubricant, a casing inclosing said valve having inlet and outlet apertures for lubricant adapted to communicate with the ports of the reciprocating valve and an inlet port for admitting liquid under pressure to operate said valve.

2. In an automatic oiler or lubricator, a valve having a series of communicating ports for steam or compressed air and lubricant, means for regulating the supply of oil or lubricant mounted in said valve, a casing inclosing said valve having inlet and outlet apertures for lubricant and a port for admitting liquid under pressure to operate the valve and deliver the lubricant under pressure.

3. In an automatic oiler or lubricator, an outer member having inlet and outlet apertures for lubricant, an inner member provided with inlet and outlet apertures for lubricant registering with the apertures of the outer member, a reciprocatable valve mounted in the inner member and provided with a series of ports for steam or compressed air and lubricant adapted to communicate with the inlets and outlets of the outer and inner members, means for regulating the quantity of oil or lubricant supplied to the valve mounted in said valve and means for operating said valve and delivering lubricant under pressure.

4. In an automatic oiler or lubricator, a casing having inlet and outlet apertures, a reciprocatable valve mounted in said casing and provided with a series of horizontal ports for lubricant adapted to communicate with the inlet and outlet apertures of the casing, a series of vertical ports adapted to communicate with the steam or compressed air inlet, a vertical port adapted to form a communication between the said horizontal ports, means mounted within said valve for regulating the quantity of lubricant supplied thereto and means for forcing the lubricant out of the oiler or lubricator.

5. In an automatic oiler or lubricator, outer and inner members each provided with inlet and outlet apertures for lubricant, a chamber in the inner member, a reciprocatable valve mounted in said chamber provided with a series of vertical and horizontal communicating ports for steam or compressed air and lubricant adapted to communicate with the apertures of the said inner and outer members, means for holding the valve in its normal position and means for operating the valve and causing it to deliver oil or lubricant under pressure.

6. In an automatic oiler or lubricator, an outer member having inlet and outlet apertures for lubricant and a steam or compressed air inlet, an inner member having an inlet and outlet for lubricant and a chamber, a reciprocatable valve mounted in said chamber and having vertical ports adapted to communicate with the steam or compressed air inlet, and horizontal ports adapted to communicate with the inlet and outlet ports of the inner and outer members, and means mounted in said valve for regulating the quantity of oil or lubricant supplied thereto.

7. In an automatic oiler or lubricator, a casing having steam or compressed air and lubricant inlet and outlet apertures, a reciprocatable valve mounted in said casing having a head and a stem each provided with vertical and horizontal communicating ports, said horizontal ports adapted to communicate with the lubricant inlet and outlet ports of the casing, a screw plug mounted in said valve for the purpose of causing the same to deliver lubricant in predetermined quantities.

8. In an automatic oiler or lubricator, a valve having a series of communicating ports, a screw plug for regulating the supply of oil or lubricant mounted in said valve and means for securing said screw plug at different elevations.

9. In an automatic oiler or lubricator, a valve having vertical and horizontal communicating ports, a screw plug mounted in said valve, means on said screw plug for securing it at different elevations and means for introducing liquid under pressure to said valve for the purpose of operating it and causing the lubricant to be forced out of the same.

10. In an automatic oiler or lubricator, an interiorly screwthreaded member having inlet and outlet apertures for oil or lubricant and an inlet for liquid under pressure, an exteriorly screwthreaded inner member adapted to screw into the outer member and provided with inlet and outlet apertures for oil or lubricant, a chamber and a socket, a valve having a head mounted in said chamber, a stem mounted in said socket and a series of communicating compressed air or steam and lubricant ports in said head and stem, means for returning the valve to its normal position and means for admitting liquid under pressure to operate the valve and deliver the lubricant under pressure.

11. In an automatic oiler or lubricator, a casing, a reciprocatable valve therein having a passage therethrough for lubricant, passages therethrough for admitting compressed air or steam to the lubricant delivery passages, means for holding the valve in its normal position and means for introducing compressed air or steam into said valve for the purpose of causing the same to operate and deliver lubricant under pressure of said compressed air or steam.

In testimony whereof I have affixed my signature.

LOUIS N. VINCENT.

Witnesses:
  DONALD MACLEOD,
  W. J. PATERSON.

Copies of this patent may be obtained for five cents each, by addressing the "Commissioner of Patents, Washington, D. C."